United States Patent [19]
Ochiai

[11] 3,806,202
[45] Apr. 23, 1974

[54] SKID CONTROLLING SYSTEM FOR VEHICLES

[75] Inventor: Takeshi Ochiai, Aichi-ken, Japan

[73] Assignee: Toyota Jidosha Koygo Kabushiki Kaisha, Aichi-ken, England

[22] Filed: July 14, 1971

[21] Appl. No.: 162,405

[30] Foreign Application Priority Data
Mar. 18, 1971 Japan.............................. 46-14731
Mar. 31, 1971 Japan.............................. 46-18689

[52] U.S. Cl........... 303/21 AF, 324/73 R, 340/52 B
[51] Int. Cl.............................................. B60t 8/00
[58] Field of Search ............ 188/181 A; 303/20, 21; 324/73 R, 162; 340/262, 410, 52 R, 52 B, 53

[56] References Cited
UNITED STATES PATENTS

| | | | |
|---|---|---|---|
| 3,516,715 | 6/1970 | Fielek, Jr. et al.............. | 303/21 AF |
| 3,275,384 | 9/1966 | Hirzel ............................ | 303/21 EB |
| 3,598,452 | 8/1971 | Clifford et al.................. | 303/21 CG |
| 3,674,319 | 7/1972 | Brugger et al................. | 303/21 CG |
| 3,650,574 | 3/1972 | Okamoto et al................ | 303/21 AF |
| 3,706,971 | 12/1972 | Okamoto et al................. | 340/52 B |

Primary Examiner—Trygve M. Blix
Assistant Examiner—Stephen G. Kunin
Attorney, Agent, or Firm—Toren and McGeady

[57] ABSTRACT

In the system disclosed, a controller signals a pressure regulator to relieve the pressure that an automobile's master cylinder applies to a wheel cylinder of the automobile, when the controller senses that the output of a wheel speed sensor is declining faster than a given rate. In this way the controller and regulator eliminate wheel decelerations in excess of a safe deceleration. The operation of the controller is tested by signals from a test circuit. The latter applies pulses whose voltage declines exceed those necessary for producing a pressure relieving signal by the controller, but causes the brake relieving signal to lie outside the range of characteristics which the regulator can detect. At the same time an indicator that responds to these signals displays a light indicating safe operation of the controller. The test signals thus cause the controller to operate but not the regulator. According to one embodiment of the invention the test signals are pulses having widths less than the response time of the regulator. According to another embodiment of the invention the test circuit lowers the amplitude of the pulse relieving signals to a value below that necessary to operate the regulator but high enough to operate the indicator.

31 Claims, 5 Drawing Figures

SKID CONTROLLING SYSTEM FOR VEHICLES

REFERENCE TO CO-PENDING APPLICATIONS

This application is related to the co-pending application of Takeshi Ochiai, Ser. No. 109,461, of Jan. 25, 1971, now abandoned, entitled SKID CONTROL SYSTEM FOR VEHICLES, and assigned to the same assignee as this application. This application is also related to the application of Takeshi Ochiai, Ser. No. 109,465 filed Jan. 25, 1971, now abandoned, entitled SKID CONTROL SYSTEM, and assigned to the same assignee as this application. The disclosure in both of these applications is hereby made a part of this application as if fully recited herein.

BACKGROUND OF THE INVENTION

This invention relates to skid controlling systems for preventing the wheels of a vehicle from locking and skidding in response to excessive brake pressure, and particularly to such systems incorporating test mechanisms to indicate proper or faulty operation.

Such skid controlling systems may be used, for example, with automobiles. In such systems a pressure regulator reduces or relieves the pressure applied by the vehicle's master cylinder when a controller detects the fact that the wheel velocity, as measured by a wheel sensor, is decreasing faster than a safe deceleration. Several embodiments of such systems are disclosed in the beforementioned co-pending applications. In one of these applications the safe deceleration is continuously re-adjusted on the basis of the condition of the road surface.

It has been suggested that such skid controlling systems be tested by detecting the reaction resulting from the interruption of the power source to the skid controlling system when the hydraulic braking pressure has been reduced for a given period of time. This type of test would have the disadvantage that it requires actual operation of the skid controlling system.

An object of this invention is to test skid controlling systems.

Another object of this invention is to avoid the problems of above-mentioned suggested arrangement.

Still another object of the invention is to improve skid controlling systems.

Still another object of the invention is to provide a skid controlling system that is capable of being tested before the skid controlling action, namely the pressure relieving action, is required to be initiated.

Another object of this invention is to provide a skid controlling system which includes a test arrangement that informs the driver of the vehicle that the skid controlling system is ready to function properly.

SUMMARY OF THE INVENTION

According to a feature of the invention, the above objects are obtained in a skid controlling system wherein regulator means relieve the braking force applied by a brake applicator to a wheel brake when control means detect that the wheel velocity declines at a rate exceeding a safe rate, by applying a test signal capable of causing the control means to issue a brake relieving indication to the regulator means and at the same time causing the indication to lie outside the given range of characteristics to which the regulator means normally responds. In this way indicator means can respond to the output of the control means and show that the control means are operating properly. At the same time the regulator means receive no signal that causes these means to relieve the force upon the brake. Preferably, the indicator is in the form of a display lamp which is visible by the driver of the vehicle. It permits the driver of the vehicle to note that the skid control system is operating properly.

According to another feature of the invention signal forming means generate the test signals that are applied to the control means.

According to another feature of the invention these signal forming means cause the indication to lie outside the range of characteristics to which the regulator means responds to relieve the braking force.

According to another feature of the invention the signal forming means apply pulses to the control means. These pulses have a width less than the response time of the regulator means. As a result the output of the control means lasts for a period of time shorter than is necessary to cause the regulator means to respond and be actuated.

According to another feature of the invention the signal forming means attenuate the amplitude of the output of the control means during the application of the test signal. The amplitude is attenuated below the threshold level necessary to actuate the regulator means. At the same time the indicator means are sufficiently sensitive to respond to the attenuated output of the control means.

These and other features of the invention are pointed out in the claims. Other objects and advantages of the invention will become obvious from the following detailed description when read in light of the accompanying drawings.

DETAILED DESCRIPTION OF PREFERRED EMBODIMENTS

Figure 1:
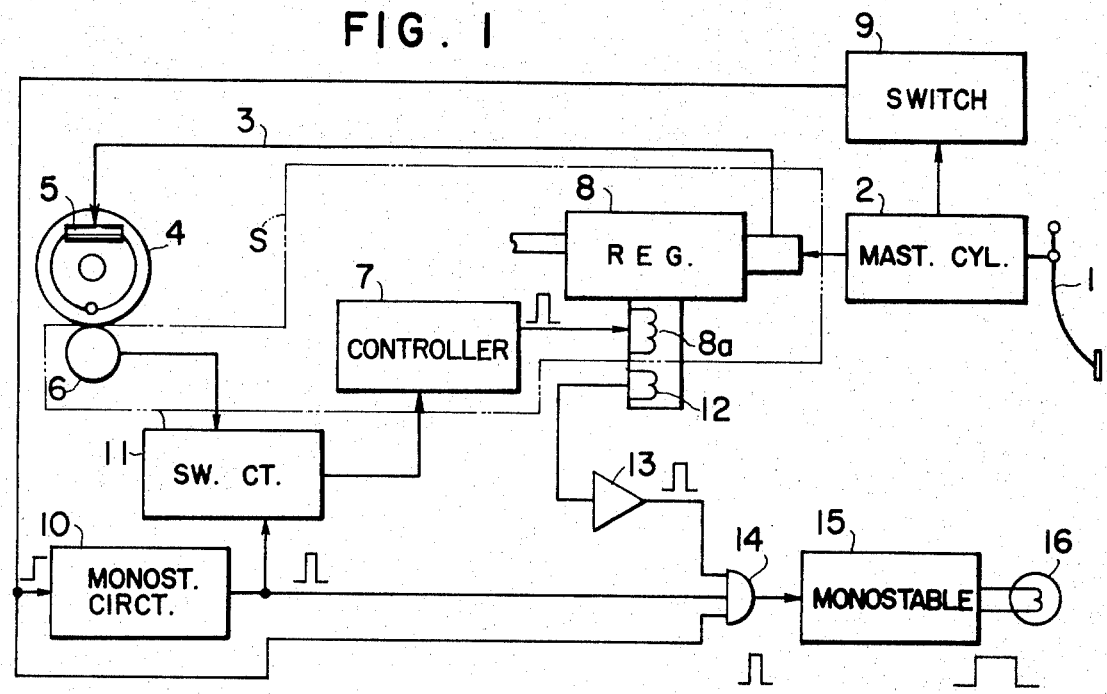
FIG. 1 is a schematic block diagram of a brake system, including a skid control system, embodying features of the invention.

In FIG. 1 a brake pedal 1 of an automobile embodying features of the invention actuates a master cylinder 2. When operated, the brake pedal is depressed by the automobile's driver. The master cylinder 2 converts the physical effort of depressing the brake pedal 1 into hydraulic braking pressure. A braking oil passage 3 applies the pressurized fluid to a wheel cylinder 5 of a wheel 4. The latter generates hydraulic braking pressure corresponding to the physical effort applied to the brake pedal 1. This slows rotation of the wheel 4 which was turned by the engine (not shown) forming part of the automobile of FIG. 1.

A rotation detector 6 senses the rotational speed or velocity of the wheel 4 and applies a voltage corresponding to the rotational velocity or speed to a controller 7. The latter generates a brake relieving signal when the rate of wheel velocity decline or deceleration, exceeds a predetermined deceleration or decline that may be established within the controller itself or from an outside source. The output signal from the controller 7 actuates a solenoid coil 8a of a hydraulic pressure regulator 8 which is interposed in the oil passage 3 between the master cylinder 2 and the wheel cylinder 5. The operation of the controller and regulator in response to the rotation detector prevents skidding by reducing the hydraulic braking pressure in response to the brake relieving signal derived from the controller 7.

The sensor 6, controller 7, and regulator 8 form a skid control arrangement S as part of the braking system which includes the master cylinder 2, the passage 3, the wheel cylinder 5 and the wheel 4. Examples of such a brake system with a skid control system are disclosed in the beforementioned co-pending applications of Takeshi Ochiai, Ser. Nos. 109,461 and 109,465, entitled SKID CONTROL SYSTEM FOR VEHICLES AND SKID CONTROL SYSTEM. In the systems disclosed by those applications a pressure modulator corresponding to the regulator 8 reduces the pressure applied by a master cylinder to a wheel cylinder when the wheel velocity as measured by a wheel detector corresponding to the sensor 6 decreases faster than a deceleration determined by a deceleration control. The deceleration control corresponds to the controller 7. In application Ser. No. 109,461 the control unit which regulates the pressure modulator also corrects the predetermined deceleration when the wheel has exceeded the slip ratio at which the co-efficient friction is maximum, so as to achieve an optimum deceleration that corresponds to road surface conditions. The control unit induces the pressure modulator to reduce the pressure of the brake fluid and restore the wheel velocity when the co-efficient friction of the wheel reaches the maximum. Brake operation in response to an emergency is thus performed with an average slip ratio at which the coefficient of friction is maximum. Further details of the operation of the brake system and its skid control system, including units corresponding to the controller and regulator, appear in these applications.

The hydraulic pressure regulator 8 responds only to signals from the controller 7 which have comparitively long durations. Specifically the regulator 8 exhibits a slow response time and thus is not actuated by signals of short duration derived from the controller 7.

In FIG. 1 a switch 9 forming a part of the master cylinder 2 responds when the pressure in master cylinder 2 increases beyond a predetermined value. The switch then produces a step function by turning an electric circuit on or off. It in effect produces a stepped voltage. A monostable circuit 10 responds to the step function by forming a pulse signal or a chain of pulse signals having a pulse width or pulse widths less than the response time of the regulator 8. The pulses may for example have widths of 2 to 10 ms. A switching circuit 11 interposed between the sensor 6 and the controller 7 applies the pulses emanating from the monostable circuit 10 to the controller 7.

As stated before, the characteristics of the controller 7 are such as to respond to rates decline in velocity-indicating voltages that exceed predetermined rates. In response to such excessive rates of decline the controller 7 produces an output voltage, preferably in the form of a pulse. As a result, the controller 7 is peculiarly adapted to respond to the sudden declines caused by pulses from the monostable circuit 10, by producing an output pulse or other output signal. However, this output signal lasts only as long as the excessively rapid decline occurs. For this reason an output signal from the controller 7 caused by pulses from the monostable circuit 10 produce short-time output signals. During the pulses from the monostable circuit 10 the switching circuit 11 cuts off the signals derived from the sensor 6 and applies the pulse signals from the circuit 10 to the controller 7.

As stated before, the hydraulic pressure regulator 8 has a response time longer than the width of the pulses leaving the monostable circuit 10. Thus, the regulator 8 remains unresponsive to the short-term signals emerging from the controller 7 and entering the solenoid coil 8a. An operating signal detector 12, which is magnetically coupled to the solenoid coil 8a, responds to the short-term current in the solenoid coil 8a and applies the resulting signal to an amplifier 13. The latter applies the signal which appears on the detector 12, which constitutes a secondary winding on the coil 8, to one input of an AND gate 14. When this signal coincides with a signal appearing from the output of the monostable circuit 10 and the step function signal from the switch 9, the AND gate actuates a monostable circuit 15 which produces an indicator signal in a display lamp 16.

In the above-described brake system the switch 9, monostable circuit 10, switching circuit 11, operating signal detector 12, amplifier 13, AND gate 14, monostable circuit 15, and indicating lamp 16 form an operating test network. The switch 9 responds to the brake pedal 1 by forming an artificial wheel locking condition signal with the monostable circuit 10 and the switching circuit 11. If the controller 7 is operating normally, it senses the locking condition from the monostable circuit 10 and issues a short brake relieving signal to the hydraulic pressure regulator 8. Because of its operating delay time, or long response time, the pressure regulator fails to respond to the short duration signals. Thus, the pressure regulator 8 performs no reduction of the hydraulic braking pressure as it would in response to normal skid control signals. This avoidance of operation occurs despite the short current flow through the solenoid coil 8. The solenoid current, after being detected by the detector 12 and amplified by the amplifier 13, is applied to the AND gate 14. Upon coincidence of the three signals from the amplifier 13, the monostable circuit 10, and the switch 9, the output of the AND gate 14 actuates a pulse in the monostable circuit 15. The latter excites the indicating lamp 16. The indicating lamp burns for a short period of time to inform the driver of the vehicle that the controller 7 is operating normally. If the controller 7 does not operate normally, no solenoid current will be detected by the detector 12. Therefore, the AND gate furnishes no output. The indicating lamp does not then illuminate. This informs the driver of the vehicle that the controller 7 is not operating properly.

Figure 2:
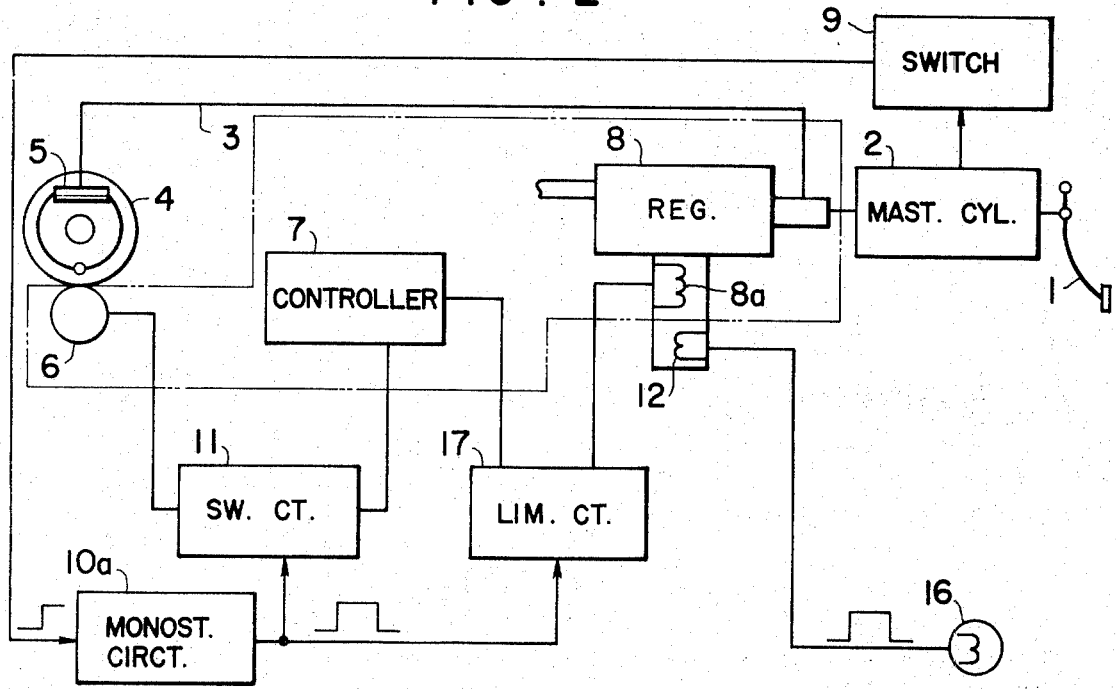
FIG. 2 is a schematic block diagram of another brake system, including a skid control system, embodying features of the invention.

Another embodiment of the invention in FIG. 1 is illustrated in FIG. 2. Here like numerals designate components corresponding to those in FIG. 1. In FIG. 2 the test system again is composed of the switch 9, the switching circuit 11, the operating signal detector 12, and the indicating lamp 16. However, the test system also includes a monostable circuit 10a for converting the stepped function from the switch 9 to a pulse signal having a comparatively long width. The test system further includes a limiting circuit 17 interposed between the controller 7 and the solenoid coil 8a of the hydraulic pressure regulator 8. The pulse signal derived from the monostable circuit 10a actuates the limiting circuit 17 to reduce the amplitude of the signal passing from the controller 7 to the solenoid coil 8a to a value less than sufficient to operate the regulator 8. This prevents the regulator 8 from operating in response to signals from the controller 7 generated by the monostable circuit 10a.

In FIG. 2 the switch 9 initiates an artificial wheel locking signal in the same manner as in the embodiment of FIG. 1. When the controller 7 operates properly it issues a brake relieving signal in response to the artificial locking signal established by the monostable circuit 10a and applied to the switching circuit 11. At the same time the limiting circuit 17 limits the amplitude of the signal current to such an extent that the hydraulic pressure regulator 8 is not actuated, while at the same time allowing current to flow in the solenoid. The signal detector 12 responds to the current flowing in the solenoid and actuates the indicating lamp 16 directly. Since the pulse width of the signal emerging from the monostable circuit 10a is comparatively long the signal emerging from the detector 12 and appearing in the lamp 16 can be noticed visually by an operator of the vehicle. If the controller 7 is not operating properly, the indicating lamp 16 does not light up. In the same manner as described for FIG. 1, the lack of illumination in the lamp 16 in response to pressure on the brake, informs the driver of the vehicle that the controller 7 is not operating properly.

In the embodiments shown in FIGS. 1 and 2 the operation of the skid control system is checked by noting whether the indicating lamp 16 lights up when the automobile's driver depresses the brake pedal 1. This helps assure safe operation of the vehicle. According to another embodiment of the apparatus disclosed in FIG. 1, the amplifier 13 is not required if the signal derived by detecting the solenoid current is sufficiently great. Moreover, if the response time of the hydraulic pressure regulator 8 is sufficiently slow and the locking condition can be developed for a long enough period of time, the monostable circuit 15 which is adapted to facilitate lighting of the indicating lamp 16 is also not required. The operating signal detector need not necessarily be constructed as an electro-magnetic induction coil but may have any number of forms.

The hydraulic pressure regulator 8 employed in the second embodiment of the invention as shown in FIG. 2 requires no specific performance characteristics as compared with the one employed in FIG. 1. In this respect the embodiment illustrated in FIG. 2 has the advantage of being able to eliminate the monostable circuit 15 for correcting the time width of the pulse signal. According to another variation of the embodiment illustrated in FIG. 2, it is not necessary to prove the limiting circuit 17 as a separate circuit. According to this variation the limiting circuit is provided at the input of a power amplifier that is adapted to drive the hydraulic pressure regulator and is located in the electric circuit of the controller 7.

According to another embodiment of the invention, the output signal of the sensor 6 is in the form of direct current. The test is achieved by applying a DC bias voltage in place of the sensor voltage while the vehicle is not moving.

The embodiments of FIGS. 1 and 2 may both be considered as utilizing particular characteristics of the regulator 8. In the embodiment of FIG. 1 the response time of the regulator 8 is utilized. The test signal applied to the regulator 8 has a width less than the response time and therefore avoids actuating the regulator 8. On the other hand in FIG. 2 the test signal is reduced an amplitude so as to avoid operating the regulator 8. In each case, of course, the regulator 8 itself need not exhibit the particular response time or response amplitude. The regulator may include internal circuits for increasing its response time or its operation amplitude threshold.

Figure 3:
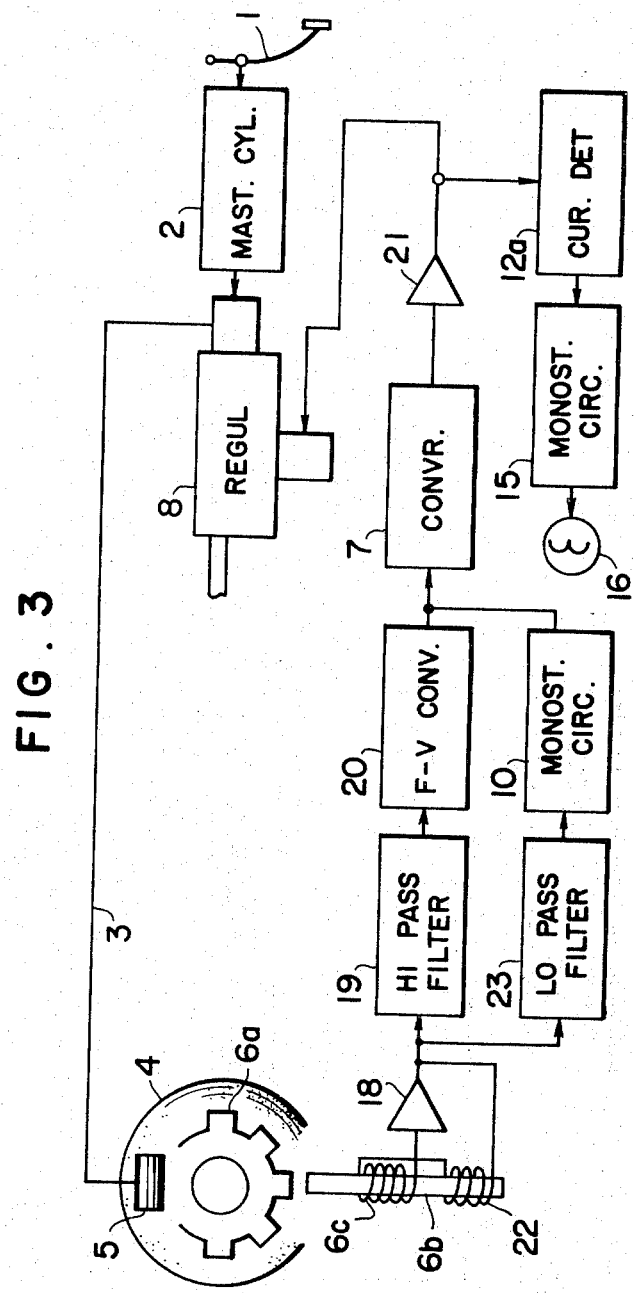
FIG. 3 is a schematic block diagram of still another embodiment of a brake system, including a skid control system, embodying features of the invention.
Figure 4:
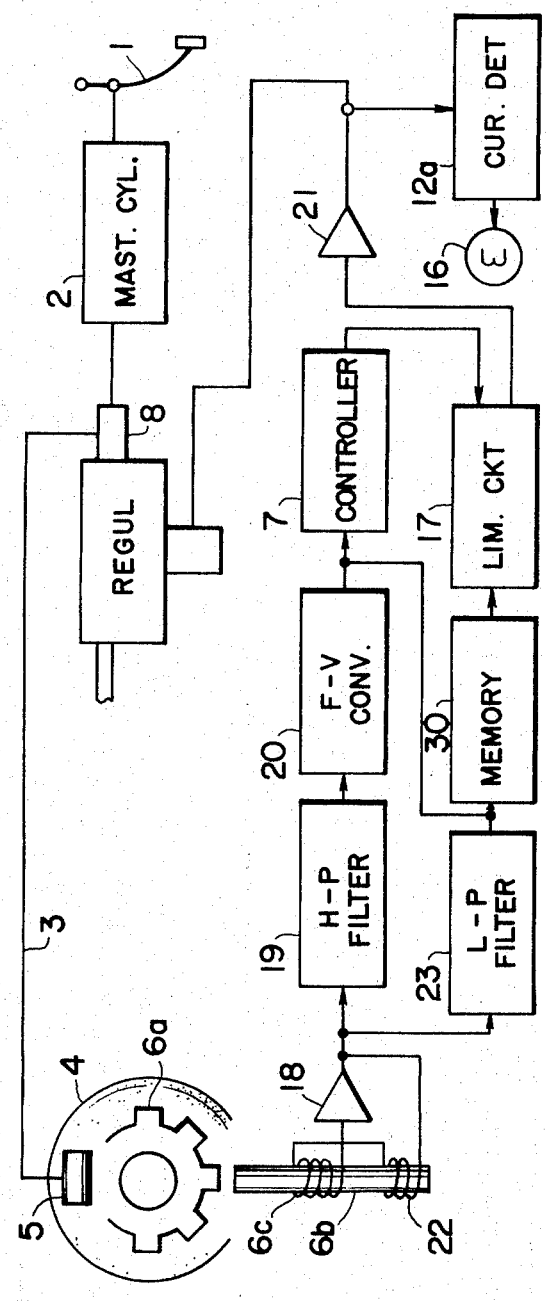
FIG. 4 is a schematic block diagram of still another embodiment of a brake system, including a skid control system, embodying features of the invention.

The embodiments of FIGS. 1 and 2 issue test signals only when the driver of the automobile depresses the brake pedal 1 while the vehicle is traveling. FIGS. 3 and 4 illustrate embodiments wherein tests are accomplished when a vehicle does not move or starts to move at low velocities.

In FIG. 3 the brake system includes the brake pedal 1, the master cylinder 2, the braking oil passage 3 and the wheel cylinder 5 of the wheel 4 as disclosed in FIGS. 1 and 2. In FIG. 3 a rotation detector R includes a serrated disc 6a which rotates with the wheel 4, an electro-magnetic pick-up 6b located at the periphery of the disc 6a, and a coil 6c for detecting the wheel speed.

Rotation of the wheel generates an alternating pulse voltage whose repetition rate corresponds to the rate of rotation of the wheel 4. An amplifier 18 applies the signal produced by rotation of the wheel in the detecting coil 6 to a high-pass filter 19. The latter applies the high-frequency portion of the signal to a frequency-to-voltage converter that produces an output voltage corresponding to the speed of the wheel 4.

The controller 7, connected to the hydraulic pressure regulator 8 through a driving amplifier 21, reduces the hydraulic braking pressure when it detects a wheel locking condition in the form of a voltage that declines faster than a predetermined deceleration. As described for the embodiment of FIG. 1, the hydraulic pressure regulator 8 responds only to long-duration signals. Alternatively, it may include means for producing a delay. According to a preferred embodiment of the invention, the response time or operation delay within the regulator 8 is 20 to 30 ms. A test signal detector coil 22 on the pick-up 6b feeds the output of the amplifier 18 back to the input side of the detecting coil 6c so as to establish a positive feed-back. This forms an oscillation circuit with the coil 6c and 22 and the amplifier 18. A low-pass filter 23 connected to the output of the amplifier 18 passes low-frequency pulses only. A monostable circuit 10 corresponding to that of FIG. 1 converts the low-frequency signals derived from the low-pass filter into pulse signals having widths smaller than the response time or operation delay time of the hydraulic pressure regulator 8. Thus, the low-pass filter and the monostable circuit 10 form a test signal that is initiated at low speeds by the sensor R which is composed of the parts 6a, 6b and 6c in FIG. 3. The controller 7 detects the pulses at the output of the monostable circuit 10 as signals indicating a wheel-lock condition and issues a short signal to the regulator 8 through the amplifier 21. Since the pulses initiated in the controller 7 by the monostable circuit 10 are too short to actuate the regulator 8 no pressure relieving signal is issued by the regulator 8. On the other hand a current detector 12a responding to the output of the controller 7 causes the monostable circuit 15 to light up the lamp 16.

In the system of FIG. 3 the test arrangement is formed by the coils 6c and 22, amplifier 18, low-pass filter 23, monostable circuit 10, controller 7, current detector 12a, monostable circuit 15, and indicating lamp 16. Even when a vehicle is not moving a direct voltage source, not shown, applies an input voltage to the amplifier 18. When the vehicle moves at low velocity, for example, 5 km/hr or less, the serrated disc rotates with the wheel at a low speed. This produces square wave pulses of very low frequency, such as 1-10 Hz. The oscillation circuit therefore produces frequencies of that order. The low pass filter 23 passes such low-frequency signals to the monostable circuit 10.

The monostable circuit 10 produces pulses at the rate passed by the low-pass filter and with widths narrower than the response time or operating delay of the regulator 8. If the controller 7 is now operating normally, the rapid rise and fall times of the pulses are sensed by the controller as excessive deceleration signals. These signals cause the controller to produce rate relieving signals whose duration is less than the response time or operation delay of the regulator 8. Thus, the regulator 8 fails to respond to these short signals. On the other hand the signals are detected by the current detector 12a. The latter initiates pulses in the monostable circuit 15. These pulses have a pulse width sufficiently great to be noticeable by the operator of the vehicle when they light up the indicating lamp 16.

If the re is any defect such as burn-out, malfunction, or the like in the coil 6a, amplifier 18, controller 7, driving amplifier 21, or hydraulic pressure regulator 8, no current is detected by the current detector 12. The indicating lamp 16 then does not burn. This informs the driver of the vehicle that the skid control system is not operating normally.

The monostable circuit 15 may produce pulses which are long enough so that these excessive pulses resulting from the signals appearing at the low-pass filter 23 merge into one another. This produces a continuous signal. It will, of course, be understood that the low-pass filter initiates a new pulse in the monostable circuit 10 for each cycle of the signals passing through the filter 23.

When the vehicle velocity begins to exceed 5 km/hr after starting, an alternating inducing voltage in the range of 100-3,000 Hz is generated in the coil 6c. This saturates the amplifier 18. At this time the low-frequency pulse signal being produced by the oscillation circuit composed of the coils 6c and 22 and the amplifier 18 is effectively rendered inoperative by the alternating high-frequency induced voltage and is drawn into the high-frequency. Thus, the low-frequency test pulse signal practically disappears. Consequently, the high-frequency alternating induced voltage which conforms to the vehicle velocity is applied to the controller 7 through the amplifier 18, the high-pass filter 19 and the converter 20. When the wheel locking condition is detected due to the excessive decline in the voltage representing the velocity, the controller 7 produces a brake relieving signal which is directed to the hydraulic pressure regulator 8 through the driving amplifier 21. The anti-skid action of the system thereby takes place.

FIG. 4 illustrates still another embodiment of the invention. Here the amplitude of the solenoid current is limited during test signals to prevent the controller from actuating the hydraulic pressure regulator. This corresponds to the operation of the embodiment illustrated in FIG. 2. In FIG. 4, the low-pass filter 23 is connected directly to the controller 7 as well as to a memory 30. The memory 30 applies its signal to the limiting circuit 17 which connects the controller 7 to the driving amplifier 21. The current detector 12a actuates the indicating lamp 16 directly.

Figure 5:
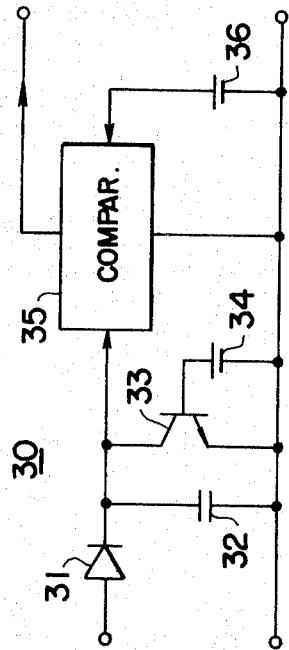
FIG. 5 is a circuit diagram of a memory employed in the embodiment of FIG. 4.

FIG. 5 illustrates the memory 30. Here a diode 31 charges a capacitor 32 with signals derived from the low-pass filter 23 and the converter 20. The capacitor voltage is applied to one side of a comparator 35. A transistor 33 biased by a power source 34 of a constant current circuit is connected across the capacitor 32 and determines the memory time. A voltage conforming to a vehicle velocity of, for example, 5 km/hr is applied by the power source 36 to the other side of the comparator 35. This comparison voltage is compared with the memory voltage at the capacitor 32. If the memory voltage is less than the comparison voltage the comparator indicates that the vehicle is almost stopped and the comparator 35 generates an output. When the vehicle is moving or when a sudden locking condition develops, no output signal issues because of the action of the memory.

When the automobile travels at a low speed or is stopped, low-frequency pulse signals are generated in the same manner as described for the embodiment of FIG. 3. The signals are applied through the low-pass filter 23 to the controller 7.

If the controller is operating normally, it senses an artificial wheel locking condition. That is, it senses voltage changes in excess of predetermined voltage changes. As a result, the controller 7 passes brake relieving signals to the hydraulic pressure regulator 8. At the same time, however, the low-frequency pulse signal is applied to the memory 30 and is stored therein for several seconds so it can be compared with the comparison voltage. The output signal from the comparison voltage is directed to the limiting circuit 17. This constrains the limiting circuit 17 to reduce the current or voltage derived from the controller 7 to a small value so as not to allow the regulator 8 to perform its pressure reducing function. Nevertheless, the current is sufficient to be detected by the current detector 12a to light the indicating lamp 16.

On the other hand if there is anything wrong with the skid control system, particularly the controller 7, the current detector 12a detects no current. The indicating lamp then does not light. This informs the driver of the vehicle that the skid control system is not operating properly.

When the vehicle velocity reaches or exceeds a particular speed, such as 5 km/hr, the low-frequency pulse signal disappears in the same manner as in the FIG. 3 embodiment. The voltage conforming to the vehicle velocity is applied from the converter 20 to the memory 30. This stops the limiting action of the limiting circuit 17 by stopping the output of the memory 30. This removes the effect of the test signal and allows the controller 7 to actuate the regulator 8.

As described above, in the embodiments of FIGS. 3 and 4, the performance of the skid control system is automatically and continuously checked when the vehicle velocity is below a set value. The result of the test is displayed by the indicating lamp 16. Illumination of the lamp indicates proper operation. Failure to illuminate indicates failure of operation.

The low-frequency pulse signal oscillating circuit of the pulse generating means may be made up of resistors and capacitors, or other types of oscillating circuits may be utilized.

In the embodiments illustrated, the skid control system may be tested either when the driver depresses the brake pedal or when the vehicle is moving at a low velocity or not moving at all. This insures the safety of the vehicle.

In FIGS. 1 through 4, when the braking systems, including the skid controlling systems with their controllers 7, operate properly, an excessive deceleration of the wheel 4 by the wheel cylinder 5 in response to sudden hard application of the brake pedal 1 produces signals which the controller 7 recognizes as representing a rate of velocity decline greater than a given rate. As a result, the controller 7 produces a brake relieving signal that lasts as long as the deceleration exceeds a given deceleration. This signal is longer than the response time of the regulator 8 and causes the regulator 8 to relieve the braking pressure between the master cylinder 2 and the wheel cylinder 5.

In FIGS. 3 and 4, when the vehicle velocity begins to exceed speeds such as 5 km/hr, and alternating voltage of 100 to 3,000 Hz is generated in the coil 6c. According to one embodiment of the invention, the low-pass filter 23 is used to reject these high frequency signals. Thus, these high frequency signals do not constitute test signals.

In FIGS. 3 and 4, the disc 6a may be composed of a temporary magnetic material or a permanent magnetic material as long as it is sufficient to coact with the pickup 6b. The feed-back system composed of amplifier 18, coil 6c, and feedback coil 22 may, according to one embodiment of the invention, be arranged as a blocking oscillator which is triggered by the serrations of the disc 6a.

It should be noted that the term solenoid current as used herein with respect to the regulator 8, refers to the current in the solenoid coil 8a.

While embodiments of the invention have been described in detail, it will be obvious to those skilled in the art that the invention may be embodied otherwise without departing from its spirit and scope.

What is claimed is:

1. A skid controlling system for regulating the braking force applied to the brakes of a wheel of a vehicle in response to a brake applicator, comprising wheel speed sensing means coupled to a wheel of the vehicle for sensing the speed of the wheel and producing an electrical signal corresponding to the sensed speed, control means for sensing the rate of change of the sensor signal and producing an indication when the deceleration exceeds a given value, regulator means adapted to be connected between the applicator and the brakes and coupled to said control means for relieving the braking force in response to the indication from said control means, said regulator means having a response characteristic that avoids response to electrical inputs outside a given range of characteristics, test means coupled to said control means and responsive to operation of the brake applicator for forming a test signal capable of causing said control means to issue an indication when the brake applicator is operated and for causing the indication to lie outside the given range of characteristics so that said regulator fails to relieve the braking force in response to the indication, and indicator means responsive to one of said control means and said regulator means for producing an output when an indication is produced.

2. A system as in claim 1, wherein the response characteristic of said regulator means includes a response time slower than a given time and wherein said test means produces a signal shorter than the given time.

3. A system as in claim 2, wherein said test means includes switch means interposed between sensor means and said control means.

4. A system as in claim 2, wherein said test means includes a pulse forming circuit for producing a pulse shorter than the response time of said regulator means.

5. A system as in claim 4, wherein said test means further includes switch means interposed between said sensor means and said control means.

6. A system as in claim 5, wherein said indicator means includes a monostable circuit for forming a test output and display means in the vehicle for displaying the output.

7. A system as in claim 1, wherein said test means includes switch means interposed between said sensor means and said control means.

8. A system as in claim 1, wherein said indicator means includes a monostable circuit for forming a test output, and display means in the vehicle for displaying the output.

9. A system as in claim 1, wherein said indicator means includes AND gate means connected to said test means and one of said regulator means and control means for responding only to coincidence of signals from said test means and one of said regulator means and said control means.

10. A system as in claim 9, wherein the response characteristic of said regulator means includes a response time slower than a given time and wherein said signal forming means produces a signal shorter than the given time.

11. A system as in claim 1, wherein said test means responds to operation of said brake applicator, and wherein said indicator means includes AND gate means connected to said test means and one of said regulator means and said control means and to the brake applicator for producing an output only upon coincidence of all signals to said AND gate means.

12. A system as in claim 1, wherein the response characteristic of said regulator means includes an amplitude threshold above a given value, and wherein said test means includes limiter means connected to the output of said control means to reduce the indication to a value less than the given threshold value.

13. A system as in claim 12, wherein said test means includes switch means interposed between said sensor means and said control means.

14. A system as in claim 13, wherein said indicator means includes a monostable circuit responsive to the signals reduced by said limiting means for forming a test output, and display means in the vehicle for displaying the test output.

15. A system as in claim 1, wherein said wheel speed sensing means includes alternating current means for producing signals whose frequencies vary in response to the speed of the wheel, wherein said test means includes low-pass filter means for passing signals corresponding to the slow speed of the wheel and circuit means responsive to said low-pass filter means for causing the indication to lie outside the given range of characteristics.

16. A system as in claim 15, wherein said sensing means includes high-pass filter means responsive to said alternating current means and frequency-to-voltage conversion means.

17. A system as in claim 16, wherein the response characteristics of said regulator means includes a response time slower than a given time, and wherein said circuit means includes a monostable circuit for producing a signal shorther than the given time, said monostable circuit being connected to apply signals to said control means.

18. A system as in claim 16, wherein said test means includes limiting means connected between said control means and said regulating means for reducing the indication, said regulating means having a characteristic such as to respond only to signals exceeding predetermined values, said limiting means reducing the indication below the value, said test means further including actuating means responsive to said low-pass filter means for actuating said limiting means in response to signals from said low-pass filter means.

19. A system as in claim 15, wherein the response characteristics of said regulator means includes a response time slower than a given time, and wherein said circuit means includes a monostable circuit for producing a signal shorter than the given time, said monostable circuit being connected to apply signals to said control means.

20. A system as in claim 15, wherein said test means includes limiting means connected between said control means and said regulating means for reducing the indication, said regulating means having a characteristic such as to respond only to signals exceeding predetermined values, said limiting means reducing the indication below the value, said test means further including actuating means responsive to said low-pass filter means for actuating said limiting means in response to signals from said low-pass filter means.

21. A system as in claim 15, wherein said alternating current means includes magnetic means movable with the wheel for forming a rotating magnetic field, and a coil for responding to said rotating magnetic field.

22. A system as in claim 21, wherein said alternating current means further includes a secondary coil, and amplifier means connected to said first coil for positively feeding back the signals from said first coil to said second coil, said second coil and said first coil being inductively coupled.

23. A system as in claim 1, wherein said test means interrupts said application of signals from said sensing means to said control means for a predetermined time during the test signal.

24. A system as in claim 23, wherein said test means normally couples said sensing means to said control means but momentarily decouples said sensing means from said control means in response to operation of the brake applicator.

25. A system as in claim 24, wherein said test means includes a switching circuit interposed between said control means and said sensing means for normally allowing passage of signals between said sensing means and said control means, and circuit means coupled to said switching means for forming the test signal and causing said switching means to apply the test signal to said control means while interrupting the signals between said sensing means and said control means during the test signal.

26. A system as in claim 25, wherein said test means further includes a switch responsive to operation of the brake applicator beyond a predetermined value, and when said circuit means includes a monostable circuit responsive to the switch.

27. A system as in claim 25, wherein said indicator means is responsive to said regulator means.

28. A system as in claim 27, wherein said indicator means includes AND gate means coupled to said regulator means and said circuit means for producing an output upon the existence of the test signal in said circuit means and said regulator means, and an indicator responsive to said AND gate means.

29. A system as in claim 28 wherein said test means further includes a switch responsive to operation of said brake applicator, said AND gate means being connected to said switch and operating when the test signal in the circuit means is coincident with the test signal in said regulator means and the switch has been operated.

30. A braking system, comprising a brake applicator brake means responsive to the applicator for slowing the wheels of a vehicle, comprising wheel speed sensing means coupled to a wheel of the vehicle for sensing the speed of the wheel and producing an electrical signal corresponding to the sensed speed, control means for sensing the rate of change of the sensor signal and producing an indication when the deceleration exceeds a given value, regulator means adapted to be connected between the applicator and the brakes and coupled to said control means for relieving the braking force in response to the indication from said control means, said regulator means having a response characteristic that avoids response to electrical inputs outside a given range of characteristics, test means coupled to said control means and responsive to operation of the brake applicator for forming a test signal capable of causing said control means to issue an indication when the brake applicator is operated and for causing the indication to lie outside the is operated and for causing the indication to lie outside the given range of characteristics so that said regulator fails to relieve the braking force in response to the indication, and indicator means responsive to one of said control means and said regulator means for producing an output when an indication is produced.

31. A braking system as in claim 30, wherein said test means interrupts said application of signals from said sensing means to said control means for a predetermined time during the test signal.

* * * * *